United States Patent
Höflich et al.

(10) Patent No.: US 11,941,547 B2
(45) Date of Patent: Mar. 26, 2024

(54) DEVICE AND METHOD FOR ASSISTING A CLIENT WHEN REQUESTING A MOBILE SERVICE VEHICLE

(71) Applicant: VOLKSWAGEN AKTIENGESELLSCHAFT, Wolfsburg (DE)

(72) Inventors: Sebastian Höflich, Lübeck (DE); Volker Römmeler, Lauingen am Elm (DE); Jan Wehinger, Braunschweig (DE)

(73) Assignee: VOLKSWAGEN AKTIENGESELLSCHAFT (DE)

(*) Notice: Subject to any disclaimer, the term of this patent is extended or adjusted under 35 U.S.C. 154(b) by 0 days.

(21) Appl. No.: 16/757,952

(22) PCT Filed: Aug. 28, 2018

(86) PCT No.: PCT/EP2018/073154
§ 371 (c)(1),
(2) Date: Apr. 21, 2020

(87) PCT Pub. No.: WO2019/081098
PCT Pub. Date: May 2, 2019

(65) Prior Publication Data
US 2020/0265346 A1 Aug. 20, 2020

(30) Foreign Application Priority Data
Oct. 27, 2017 (DE) .................. 10 2017 219 363
Jun. 1, 2018 (DE) .................. 10 2018 208 701

(51) Int. Cl.
G06Q 10/02 (2012.01)
G06Q 50/10 (2012.01)
H04W 4/40 (2018.01)

(52) U.S. Cl.
CPC ............ *G06Q 10/02* (2013.01); *G06Q 50/10* (2013.01); *G06Q 50/40* (2024.01); *H04W 4/40* (2018.02)

(58) Field of Classification Search
CPC ........ G06Q 10/02; G06Q 50/10; G06Q 50/30; H04W 4/40
See application file for complete search history.

(56) References Cited

U.S. PATENT DOCUMENTS

2010/0280932 A1 11/2010 Jensen et al.
2013/0030645 A1 1/2013 Divine et al.
(Continued)

FOREIGN PATENT DOCUMENTS

DE 202015106556 U1 1/2016
JP 2002225756 A 8/2002
(Continued)

OTHER PUBLICATIONS

Andaloro, L., et al. "Development of a new concept electric vehicle for last mile transportations." World Electric Vehicle Journal 7.3 (2015): 342-348. (Year: 2015).*

(Continued)

*Primary Examiner* — Emmett K. Walsh
(74) *Attorney, Agent, or Firm* — Barnes & Thornburg LLP (57) ABSTRACT

A device and method for assisting a client when requesting a mobile service vehicle which includes a vehicle carriage and a passenger compartment temporarily connected to the vehicle carriage and equipped for the service in question. The method includes determining a need of the client for obtaining a service during a journey, determining that the client's preference for meeting the need cannot be met and, automatically emitting an alternative suggestion to meet the need.

12 Claims, 3 Drawing Sheets

(56) References Cited

U.S. PATENT DOCUMENTS

| | | | |
|---|---|---|---|
| 2013/0054375 A1* | 2/2013 | Sy | G06Q 50/14 |
| | | | 705/14.66 |
| 2015/0081175 A1 | 3/2015 | Fear | |
| 2017/0169364 A1* | 6/2017 | Keen | H04L 67/306 |
| 2017/0228945 A1 | 8/2017 | Lee et al. | |
| 2019/0057476 A1* | 2/2019 | Zhang | G06Q 30/0613 |

FOREIGN PATENT DOCUMENTS

| | | | |
|---|---|---|---|
| KR | 10200479693 A | 10/2004 | |
| KR | 200479693 Y1 | 2/2016 | |
| KR | 20170006396 A | 1/2017 | |

OTHER PUBLICATIONS

HANLON; Rinspeed to show personal mobility ecosystem at CES 2018; Oct. 12, 2017; downloaded from https://newatlas.com/rinspeed-snap-comprehesive-mobility-ecosystem/51722/.

Luxury Mobile Barbershop; downloaded prior to Oct. 27, 2017; downloaded from https://www.luxurymobilebarershop.com/.

WEISS; GM advances stealthily into disaster relief zones with autonomous fuel cell concept; Oct. 10, 2017; downloaded from https://newatlas.com/gm-surus-fuel-cell-platform/51660/.

Wikipedia; Abrollcontainer-Transportsystem (Roller Container); Jul. 19, 2017; downloaded from https://de.wikipedia.org/w/index.php?title=Abrollcontainer-Transportsystem&oldid=167387482.

Wikipedia; Location-based Service; Oct. 10, 2017; downloaded from https://en.wikipedia.org/w/index.php?title=Location-based_service&oldid=804736013.

Wikipedia; Mobile Web; Sep. 12, 2017; downloaded from https://en.wikipedia.org/w/index.php?title=Mobile_Web&oldid=800340591/.

Search Report for International Patent Application No. PCT/EP2018/073154; dated Oct. 1, 2018.

Doo-Won; [Autonomous Vehicle Planning (1)] One day in 2040 when autonomous vehicles become common; The tech M; vol. 48; Apr. 4, 2017; downloaded from https://www.techm.kr/news/articleView.html?idxno=3767.

Young-Sook; [Housing Revolution] In the era of self-driving cars, all canteens will be mobile; The block chain AI news; Sep. 7, 2017; downloaded from http:/blockchainai.kr/client/news/newsView.asp?nldx=32528.

Office Action for Korean Patent Application No. 10-2020-7015293; dated Feb. 11, 2022.

Lian et al.; Flight Attendant Catering Service Practice; Apr. 30, 2012; p. 164; Shanghai Jiaotong University Press.

Office Action; Chinese Patent Application No. 201880070048.6; dated Jul. 29, 2023.

* cited by examiner

DEVICE AND METHOD FOR ASSISTING A CLIENT WHEN REQUESTING A MOBILE SERVICE VEHICLE

PRIORITY CLAIM

This patent application is a U.S. National Phase of International Patent Application No. PCT/EP2018/073154, filed 28 Aug. 2018, which claims priority to German Patent Application Nos. 10 2017 219 363.8, filed 27 Oct. 2017 and 10 2018 208 701.6, filed 1 Jun. 2018, the disclosures of which are incorporated herein by reference in their entireties.

SUMMARY

Illustrative embodiments relate to an apparatus and a method for assisting a customer when requesting a mobile service vehicle composed temporarily of a vehicle carrier and a cabin (CAB) configured in a service-specific state. In particular, illustrative embodiments relate to a practice of assisting a customer in the best possible way if his preference cannot be met or is not available.

BRIEF DESCRIPTION OF THE DRAWINGS

Exemplary embodiments are described in detail below based on the attached drawings, in which.

DETAILED DESCRIPTION

Private transportation is currently making rapid advances. On the one hand, jointly used transportation methods or mechanisms (car sharing, pool vehicles, etc.) are increasingly in demand and are being offered in an ever more professional way. On the other hand, the automation of private passenger transportation is also advancing at an increasing pace, permitting the occupants of corresponding transportation vehicles to make use of the travel time in other ways.

In contrast, up until now services have usually been offered in stationary facilities (e.g., "retail stores"). Providers of stationary services have hitherto been faced with the problems that they can only achieve high turnover rates in expensive prime locations, that scaling is difficult, that rental contracts tie them to one location in the long term and that the investment costs and the business risk are high.

End customers wishing to experience the service sometimes have to travel long distances and accept high costs for the stationary services. Consequently, the end customer spends not only the traveling time to his place of work but additionally the time to the respective service provider (e.g., restaurant, lawyer, public authority) in his transportation vehicle. At present, a German person spends approximately 60 minutes per day in his transportation vehicle. In addition, many older persons can no longer drive. Autonomous driving makes this possible again.

Depending on the sector, approaches are also known in which the service comes to the customer. For example, hairdressing services are offered at home or traveling retail traders (the "egg man") stop by in residential areas to sell goods there.

The provision of services to passengers is already known in isolated cases. For example, gastronomic services can be used in long-distance trains or audiovisual contents ("on-board cinema") can be consumed.

DE 20 2015 106 556 U1 discloses a mobile apparatus for the mobile provision of different services of a modular design, comprising a drive unit, an energy storage unit and/or associated electronics. A replaceable service module, which can comprise, for example, a faucet module, a cooling module, an ice module or a wet section, is connected to a chassis in a reversible manner by corresponding locking points.

UBER has in the meantime been using bicycle couriers to deliver food directly to a transportation vehicle. It is therefore possible for at least the results of gastronomic services to be enjoyed in conventional transportation vehicles at minimum additional cost. On the other hand, the transportation vehicles themselves are not embodied in a service-specific manner. In addition, the service is not provided in the transportation vehicle but rather ends at the transportation vehicle door with the handing over of the food.

Www.luxurymobilebarbershop.com offers a mobile hairdressing salon in which the customer defines the location of the service (for example, airport car park), and the driver drives the mobile hairdressing salon to the defined destination to provide the service there.

Services which are offered in transportation vehicles already offer on-demand services nowadays, particularly in the luxury segment. These services provide their end customers with geographical independence, a saving in time and exclusivity, but usually at a price which is too high for large customer groupings. Services which are offered in transportation vehicles can nowadays usually be found in the luxury segment owing to high investment costs and lack of capacity. The reasons for this are that the transportation vehicle has to be bought for conversion, the conversion requires a large amount of manual work, few standard components are available, the service provider has to travel long distances between the customers, and finally the operative management (payment, booking, taxes) has to be dealt with independently by the service provider. In addition, extensive modifications of transportation vehicles are always associated with costly individual acceptance procedures at the relevant authorities.

Taking the above-mentioned prior art as a starting point, disclosed embodiments make it possible to assist a user in the best possible manner if his preference cannot be met or his preference is not available.

The disclosed embodiments are based on the fundamental idea that the consumption willingness of passengers is fundamentally higher than if the same person must spend freely available time on the consumption of a service.

To better adapt the consumption of services during transportation to the requirements of the service provider and the customer, the disclosed embodiments are based, for example, on the concept of providing transportation vehicle platforms having all technical units needed for autonomous driving, such as chassis, drive unit etc., which can be connected, if necessary, to passenger compartments tailored to the provision of a service during the journey. The passenger compartments are referred to as "CABs" within the scope of the present disclosure. "CAB" stands for "cabin".

In other words, a CAB is a vehicle superstructure which is adapted for a specific service or a group of services and contains all interfaces to accommodate and operate the device needed to provide the service.

The CAB can therefore be understood as meaning a mechanical unit which can be connected as such to the vehicle platform/the vehicle carrier via predefined interfaces. The interfaces ensure a mechanically reversible, but reliable connection between the CAB and the vehicle carrier. Further interfaces can be configured to transmit energy, in particular, electrical energy, between the CAB and the vehicle carrier. These interfaces are also reversible. Further operating resources (fluids), mechanical energy transmission methods or mechanisms, for example, shafts, gearwheels or the like, for mechanically transmitting energy from the vehicle carrier to the CAB, as well as radio connections and/or a data connection between the individual CAB and the vehicle carrier as well as their modules may be provided. For all IT connections of the vehicle carrier to the CAB, electrical and/or optical lines, in particular, bus systems, are appropriate as interfaces, for example.

To make it possible to configure a mobile unit (also "mobile service vehicle") composed of a vehicle carrier and a CAB in a cost-effective and rapid manner and with little susceptibility to faults, provision can be made for all the interfaces between the CAB and the vehicle carrier to be arranged in an essentially identical direction corresponding to one another. In other words, a CAB can be engaged mechanically with the vehicle carrier in a first direction, in which case rails, for example, ensure a form-fitting connection between the CAB and the vehicle carrier. The same direction can be provided for the energy connection between the vehicle carrier and the CAB. It can be ensured that a correct mechanical connection between the vehicle carrier and the CAB automatically results in a correct energy connection of the vehicle carrier to the CAB. The same can apply to the interfaces for transmitting operating resources. Insofar as data are also to be interchanged between the CAB and the vehicle carrier (e.g., bidirectionally), it is possible, for example, to arrange, correspondingly, circuit-switching interfaces and to close them automatically when the connection is formed between the vehicle carrier and the CAB. However, this does not rule out a wireless transmission of data between the vehicle carrier and the CAB, for which purpose interfaces can likewise be provided. A plurality of interfaces, in particular, standardized interfaces which are essentially the same, can at least be spatially combined and can be arranged in a reversible manner, but protected from undesired release, at corresponding positions on the vehicle carrier/the CAB.

By virtue of the above-mentioned standardization, boundary conditions which are necessary for providing services during the journey can be provided, which conditions enable a considerable reduction in costs and a hitherto unrivaled degree of individualization of transportation vehicles. While the CAB s provide the service providers with predefined frameworks, to offer their service in a reliable and suitable way for the users, the vehicle carrier ensures efficient, comfortable, rapid and time-saving transportation, in particular, in the case of vehicle carriers which are capable of automatic driving. As a result, an individual service is offered to persons who are elderly or unfit to drive as well as children during the journey.

The above-mentioned concept composed of a vehicle carrier and a CAB makes it possible to provide individualized services while traveling, in which case the described concept constitutes the physical platform which is made available to potential customers in conjunction with a digital intermediary platform (server). The technology which is disclosed here describes the interaction between the individual components and players in the platform ecosystem. It allows the free time which comes about as a result of the autonomous driving or taxi journeys to be used and monetarized in an optimum way.

Problems of various players are solved in the platform ecosystem. In this context, it is necessary to differentiate between end customers (use services during the journey), service providers (provide services during the journey, such as, e.g., lawyers) and microservice providers (provide modules for equipping the transportation vehicles). The modules do not have to be physical or to relate to the concrete internal equipment of the CAB but instead could also be software modules, e.g., a presentation of a restaurant menu on a display.

The provision of mobile service vehicles composed of the vehicle carrier and CAB can be effected, for example, by a server in conjunction with (mobile) wireless communication terminals ("user terminal") used by the customer/service provider. An application constitutes the interface to the end customer here. The end customer books the mobile on-demand services via the application. To do this, the end user defines the starting point, destination, starting time and type of service to be provided during the journey. End customers can carry out other tasks via the application, for example, can send requests, view search results, book mobile service vehicles/services, give ratings and pay for the booked or acquired services.

The service provider can digitally keep available its own profile, by which the end user can be informed of the services offered, customer opinions etc. If the end user decides to obtain a service, his request is displayed on the user terminal belonging to the mobile service provider or in the vehicle thereof. The service provider can accept the request, thus resulting in the combined transportation/service agreement.

Services which can be provided within the scope of the present disclosure can, for example, be divided up into the following forms/categories:
  the service can be provided by a person or in an unmanned state (e.g., a hairdresser as opposed to a multimedia presentation), and
  individualized CAB or mass-produced goods (e.g., generic restaurant as opposed to a system-gastronomy business).

In summary, the vehicle architecture on which the present technology is based comprises at least two concrete components: the component which is necessary for transportation is referred to as a "vehicle carrier" in which the technology for autonomous driving can be located. In addition, the vehicle superstructure (CAB) is used which contains all the interfaces for accommodating and operating the specific device which is needed to provide the service. The transportation vehicles which are composed of the above-mentioned components are also referred to as a "mobile service vehicle". They could also be referred to as "physical apps on wheels", since they are as versatile in terms of their range of functions as smartphone platforms which are individualized by applications.

On the basis of the technology disclosed above, the embodiment mentioned above is of a method for assisting a customer when requesting a mobile service vehicle composed temporarily of a vehicle carrier and a CAB configured in a service-specific manner. The customer can declare his need to obtain a service during a journey via a mobile user interface (smartphone, tablet or the like), for example. Alternatively or additionally, the customer's need to obtain the service can also be determined using sensors and/or automatically. Alternatively or additionally, the need to (briefly) obtain a service can be determined on the basis of a digital calendar and/or on the basis of a digital task list. It is then determined that the customer's preference for satisfying the need (for the service) cannot be met. The customer can declare the preference, for example, by explicitly selecting a mobile service vehicle, a CAB, a provider or the like. The preference may also arise from a predefined configuration which has been defined by the customer, for example, in a personal profile of an application managing service requests for the mobile service vehicles. The preference may relate to service categories and/or to other properties of the mobile service vehicles, of the CABs and/or of the persons providing the service. In response to determining the fact that the customer's preference cannot be met, an alternative suggestion with respect to the preference is then automatically output. The alternative suggestion can also be automatically generated. The output may likewise be effected, for example, via a smartphone/an electronic data processing device belonging to the customer. The alternative suggestion can be generated by comparing the customer's preference with properties/states of further mobile service vehicles/CABs. For example, an identical service can be offered by another operator of the alternative CAB on an identical or similar route. Alternatively or additionally, a similar service can be offered on a similar or identical route. For example, on the basis of a journey history of the user, it is possible to select a CAB/service, as an alternative suggestion, which has been used by the user at an earlier time under similar boundary conditions (for example, time, day, destination, departure point). Alternatively or additionally, the alternative suggestion may describe a completely different service which, however, corresponds to the times and/or route of the customer's preference in the best possible manner. The alternative service may likewise be determined, for example, from a personal calendar or a personal task list of the customer and should likewise be performed within a short period. This assists the customer in the best possible manner when using his time during the journey with a disclosed mobile service vehicle. The customer is assisted in the best possible manner when performing his tasks by obtaining services during a journey.

The need for the service can be effected, for example, by selecting a CAB and/or a mobile service vehicle by an application which is executed on a smartphone. For example, the user can input a name and/or a service, to which at least one mobile service vehicle can be assigned, in a search field. A corresponding definition of the mobile service vehicle/the CAB can also emerge from a presentation of search results which includes a multiplicity of CABs/mobile service vehicles. The presentation of search results may have been generated, for example, in response to the definition of a starting location and/or a destination and/or a departure time and/or an arrival time and/or a service category or service to be obtained during a journey. For this purpose, CABs/mobile service vehicles registered in stationary server may have been sorted and may have been displayed to the user, for example, using the Internet. In this manner, the user can determine the boundary conditions for the service to be provided during the journey or his need to obtain a service during the journey in a manner which is as flexible as possible.

Optionally, the alternative suggestion can be highlighted in a presentation of search results. For example, optical highlighting (for example, color design and/or contrast), a size which is changed in comparison with other entries and/or a manner of presentation which changes in a predefined manner over time with respect to the presentation of the other entries can highlight the alternative suggestion. For example, the alternative suggestion may have a higher priority within the presentation of search results. In other words, the alternative suggestion can be displayed at the very top of the presentation of search results, for example. Alternatively or additionally, the customer's preference may be removed from the presentation of search results, while the alternative suggestion (for example, indicated as such) is displayed continuously in the region of the preference instead of the latter. In this manner, the customer can associate the alternative suggestion with the preference which cannot be met in the best possible manner and in a particularly intuitive way and can select the alternative suggestion with the fewest possible manipulations. This makes it possible to dispense with a complicated search for further alternatives. The user acceptance and the energy consumption as well as the wear and tear of the user interface used to select the alternative suggestion can therefore be reduced.

The capability of the disclosed system to meet the preference can depend, for example, on whether a CAB assigned to the preference has a predefined ready status (for example, "available") and/or an occupancy status (for example, "at least X spaces free" or "service available on board"). If it is therefore automatically determined that a state/status of his preference, as requested by the user, is not available, the alternative suggestion can be automatically presented.

On account of the many different possible ways of finding an alternative suggestion for a preference which cannot be met, provision may be made for a data record which especially qualifies a CAB as an alternative suggestion to be taken into account when presenting the alternative suggestion. In other words, even before determining the customer's need to obtain the service, a data record can be assigned to a particular CAB or a particular provider of CABs, on the basis of which the CAB/the provider is automatically qualified as an alternative suggestion without further investigations. This selection can be made within the scope of predefined boundary conditions. For example, a predefined degree of relationship between the requested service (the preference) and the service which can be provided within the CAB qualified as an alternative suggestion by the data record can be positively checked to qualify the CAB as an alternative suggestion. Corresponding boundary conditions can also be made with respect to the journey time and/or with respect to the departure point/destination of the journey. In this manner, there is no need for complicated investigations and filtering of the available mobile service vehicles since the data record automatically qualifies the CAB/the mobile service vehicle as an alternative suggestion without complicated further investigation operations. Alternatively or additionally, the data record may define a boundary condition which can be used to draft the contract for booking the alternative suggestion. On account of the impossibility to meet the preference, a fastest possible definition of changed booking conditions can be effected in this manner. For example, changed pricing and/or changed cancellation conditions may be important for the decision by the consumer/ customer who is willing to pay a reduced price or to accept less suitable boundary conditions for selecting an alternative suggestion with (possibly less suitable) boundary conditions. For example, by virtue of the boundary conditions defined in the data record, the user can use a test period (for example, 5 minutes, 10 minutes or the like) to sufficiently test (free of charge) the alternative with respect to his preference and to state his agreement to a binding booking/payment. This increases the utilization of disclosed mobile service vehicles since the customer's willingness to accept the alternative suggestion is increased. To adapt the alternative suggestion to the customer's needs in the best possible manner, it is possible to resort to further information which provides information on the customer and his needs. For example, on the basis of a personal movement and/or consumption history of the customer, it is possible to decide which CAB/mobile service vehicle is particularly suitable as an alternative suggestion for the customer. For example, it is possible to evaluate data material which is stored in a data memory of a server and/or in a mobile device/an application and provides information relating to preferences of the customer in similar situations and/or at similar times and/or on similar routes and/or when expecting similar circumstances at the destination on the day. In this manner, the selection of an adequate alternative suggestion can be prepared/effected in the best possible manner.

A second disclosed embodiment proposes a mobile or stationary apparatus for assisting a customer when requesting a mobile service vehicle. The apparatus comprises at least one data input, an evaluation unit (for example, a computer, a programmable processor, an electronic control unit or the like) and a data output. The evaluation unit is configured to determine a need of the customer to obtain a service during a journey by the data input. Moreover, the evaluation unit can determine that a preference of the customer for satisfying the need cannot be met and an alternative suggestion should therefore be presented to assist the customer in the best possible manner with the organization of his time. The evaluation unit is configured to automatically output an alternative suggestion with respect to the preference by the data output. The apparatus may be a mobile communication device. For example, it may be a smartphone and/or a tablet in this case. Alternatively, the apparatus may be a stationary device comprising a server, a data memory and appropriate communication methods or mechanisms. In any case, the disclosed apparatus is configured to carry out the method according to the disclosed embodiment mentioned first and to implement the features, combinations of features and the benefits resulting therefrom in a corresponding manner, with the result that reference is made to the statements above to avoid repetitions.

A third disclosed embodiment proposes a computer program product (for example, a data memory) on which instructions are stored which enable a programmable processor to carry out the method mentioned first. The computer program product may be a CD, a DVD, a Blu-ray disc, a flash memory, a hard disk, RAM/ROM, a cache etc.

A fourth disclosed embodiment proposes a signal sequence representing instructions which enable a programmable processor to carry out the method according to the embodiment mentioned first. This also protects the IT provision of the instructions if the storage methods or mechanisms required for this purpose are outside the area of validity of the attached claims.

Figure 1:
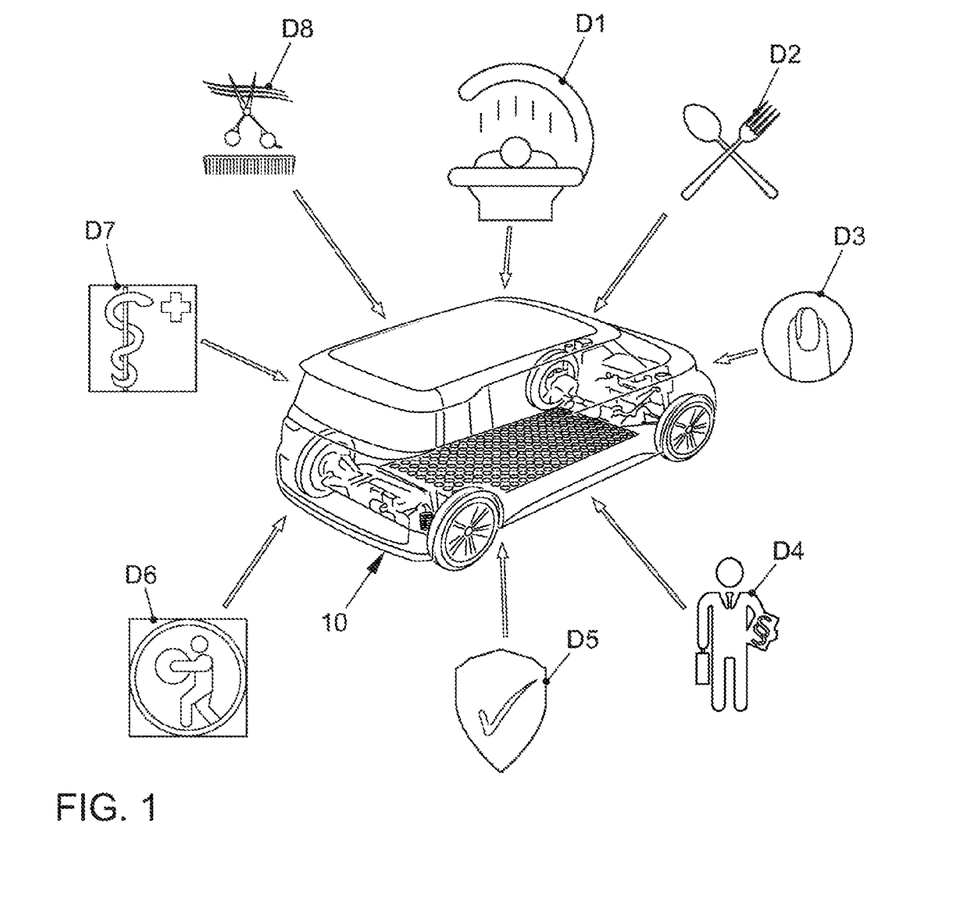
FIG. 1 shows a basic diagram illustrating exemplary embodiments which can be used for CABs in conjunction with a vehicle carrier to achieve a mobile service vehicle.

FIG. 1 shows a schematic illustration of a vehicle carrier 10 of a mobile service vehicle according to at least one exemplary embodiment of the technology disclosed here.

Figure 2:
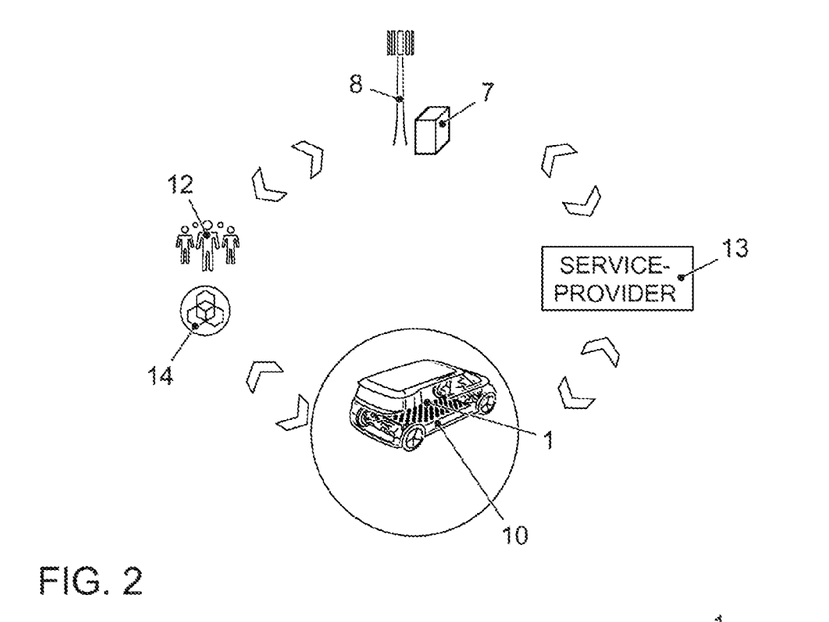
FIG. 2 shows a schematic illustration of a platform ecosystem for illustrating information flows.
Figure 3:
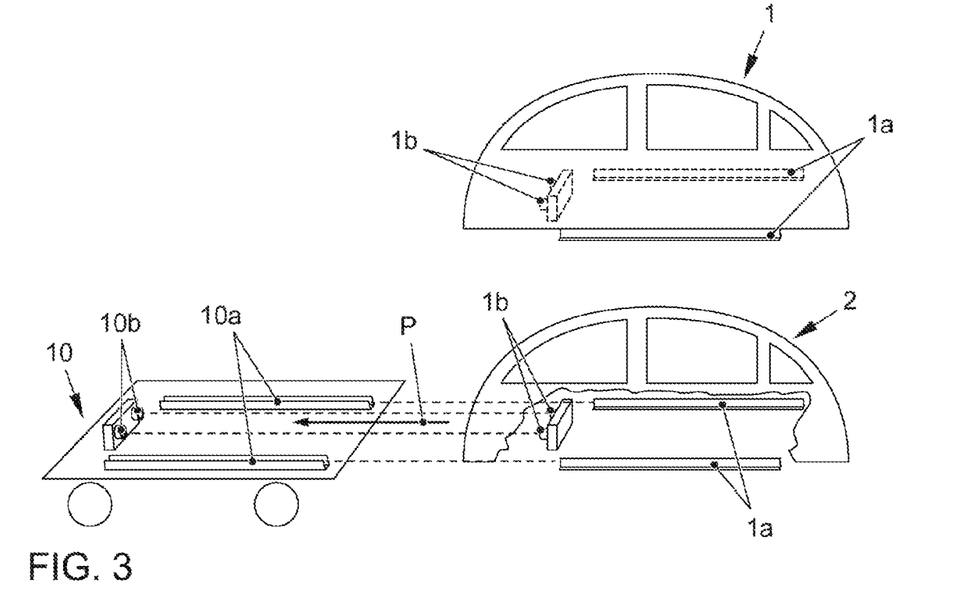
FIG. 3 shows a schematic illustration of a vehicle carrier, two CABs and their mutual interfaces according to an exemplary embodiment.

The vehicle carrier in this case provides all features which are required for transportation, in particular, automatic transportation. The chassis, the drive train, the energy store, longitudinal/lateral control logic and devices, exterior lighting, etc. are mentioned merely by way of example. Within the scope of the technology disclosed in the present case, CABs (not illustrated) are used to specifically configure the vehicle carrier to provide a respective service D1 to D8. For example, an irradiation and/or tanning device D1, such as a CAB, can be connected to the vehicle carrier 10 to be able to offer the "tanning" service. For example, a UV irradiation unit and/or a tanning shower may be included. To be able to provide gastronomic services D2, a restaurant CAB may be connected to the vehicle carrier 10. The preparation of food and the consumption of the latter can be enabled by the configuration of the CAB. A cosmetic or nail care service D3 may require, for example, the CAB to have special workbenches, an extraction system for rapidly exchanging the interior air and particularly bright illumination devices (so-called spotlights). To provide legal advisory services D4, a library and/or at least two seating areas may be provided in an accordingly configured CAB. The same applies to an insurance advisory service or financial advisory service D5. Video conferencing hardware and a large screen for displaying graphics and other presentation contents may be provided in this case. Rehab services D6 and medical services D7 can also be supported in the best possible manner by the configuration of a respective CAB. For example, examination and/or training devices may be parts of corresponding CABs. To be able to provide hairdressing services D8, a sink, as is conventional in hairdressing salons for washing hair, a 230-V plug for operating a hairdryer, a large mirror and a height-adjustable hairdressing chair can be provided, for example. The above-mentioned CABs can be connected to the vehicle carrier 10 in a mechanically fixed and crash-proof manner via reversible mechanical interfaces. To ensure energy and information flows between the vehicle carrier 10 and the CAB, reversible interfaces illustrated in detail in conjunction with FIG. 3 are proposed. FIG. 2 shows a schematic illustration of a platform ecosystem for illustrating information flows when implementing the technology disclosed in the present case. A microservice provider 14 individualizes the CABs 1 of the mobile service vehicles, which are then connected to a respective vehicle carrier 10 (temporarily or permanently) and are provided. The provision of the mobile service vehicles is carried out by a service provider 13 which determines the need of the users 12 via a server 7 and, for example, a radio tower 8 of a wireless communication network and compares it with the fundamentally available/offered mobile service vehicles. The best possible combinations of offered mobile service vehicle and interested user 12 result in the conclusion of an individual contract regarding the provision of a mobility service and a CAB-specific service. The microservice provider 14 can also provide the individual service or a service package with respect to the end customer and can monitor and ensure the operation of the mobile service vehicle or the CAB for this purpose or can even provide a manual service in a manned mobile service vehicle on board the mobile service vehicle. It goes without saying that the service provider 14 need not be identical to the manufacturer/outfitter of the CAB 1. In this respect, different constellations with respect to the design, the creation and the use of the CABs arise when providing the service with respect to the end customer.

FIG. 3 shows a basic perspective diagram for temporarily connecting a vehicle carrier 10 to a first CAB 1 or to a second CAB 2. Mechanical interfaces 10a which are equipped in a manner corresponding to one another on the vehicle carrier 10 and mechanical interfaces 1a in the CABs 1, 2 ensure a rapid and crash-proof connection between the CAB 1, 2 and the vehicle carrier 10. If information and/or energy is intended to be exchanged by the CAB 1, 2 with the vehicle carrier 10 or the other way round, additional interfaces 1b, 10b corresponding to one another are arranged on the CABs 1, 2 and the vehicle carrier 10 and are likewise engaged with one another in the direction of an arrow P. Alternatively or additionally, further or alternative interfaces between the CABs 1, 2 and the vehicle carrier 10 can engaged with one another in a corresponding manner. For example, a heating/cooling power, hydraulic energy, compressed air, etc. can be exchanged between the CABs 1, 2 and the vehicle carrier 10. The interfaces can be monitored using IT, with the result that a use/journey of the mobile service vehicle is enabled only if contact is properly made with the respective interfaces and the interfaces are accordingly locked. Whereas the illustrated mechanical interfaces 10a of the vehicle carrier 1 are configured with U-shaped or rail profiles which can be engaged with T-shaped profiles illustrated by way of example as interfaces 1a of the CABs 1, 2, it goes without saying that other mechanical interfaces are possible and can possibly be engaged with one another in a direction other than that of the illustrated arrow P. However, if the CABs 1, 2 can be mounted in a jacked-up manner at a suitable height, the vehicle carrier 10 can automatically move under the CAB 2, as illustrated, in which case the interfaces 1b, 1a, 10b, 10a are engaged with one another without the need for a complicated lifting apparatus or the like. If necessary, an air suspension of the vehicle carrier 10 can be used to carry out a slight height adjustment. Whereas, within the scope of the technology disclosed in the present case, a CAB need not necessarily be understood as meaning a passenger compartment with service-specific internal equipment, this is a suitable configuration of the technology disclosed in the present case. Alternatively, in the sense of the technology disclosed in the present case, the CAB may be an only temporary part of the passenger compartment (integrally produced with the vehicle carrier 10). In this configuration, the interfaces illustrated in FIG. 3 (or other suitable interfaces) can be arranged between the CAB and the passenger compartment. The interfaces may be arranged, for example, on the roof and/or in the side panels and/or in the base of the CAB and the passenger compartment.

Figure 4:
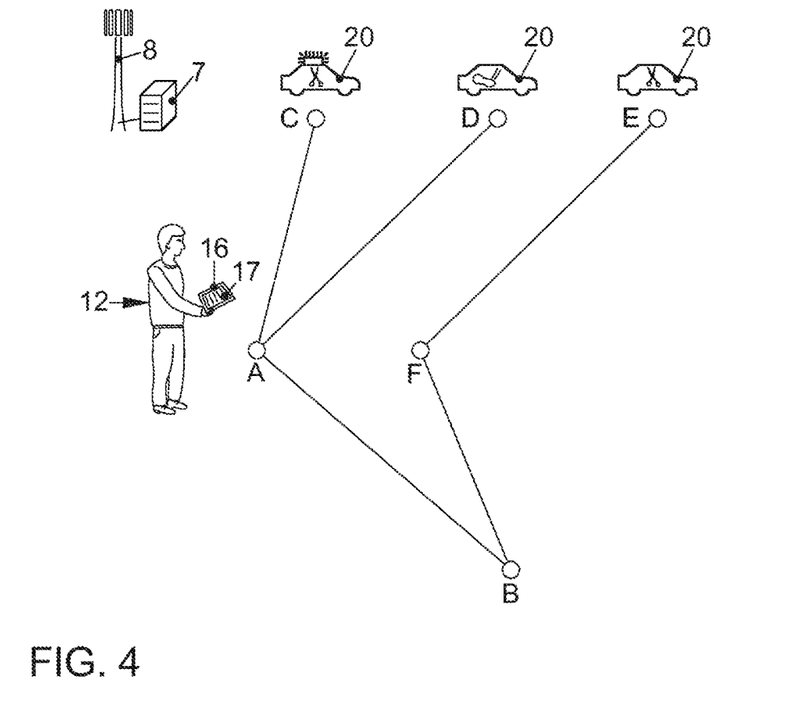
FIG. 4 shows a schematic illustration of a scenario in which an exemplary embodiment of a disclosed method is assisted by an exemplary embodiment of a disclosed apparatus.

FIG. 4 shows a customer 12 who would like to book a mobile service vehicle 20 for the journey from his current position A to a target position B via his smartphone 16 as a wireless user terminal. On board the mobile service vehicle 20, the customer 12 would like to obtain a hairdressing service and has therefore specified the route A-B, the period desired by him and the hairdressing service. A list of search results 17 is then displayed to the customer on his smartphone 16, which list does not contain the preference of the customer 12, a mobile service vehicle 20 at the position C, since it is currently occupied. The status of the mobile service vehicles 20 is collected via a server 7 as an evaluation unit and is compared with incoming requests from the customer 12 via a radio tower 8 as a data input and data output. To nevertheless motivate the customer 12 to book a service/mobile service vehicle 20 with an alternative which is as suitable as possible, the server 7 identifies a mobile service vehicle 20 which is at the position D and could pick up the customer 12 at his current position A and could drive him to the target position B. However, only a barber service and not the hairdressing service originally desired/preferred by the customer 12 is available on board. A further alternative is the mobile service vehicle 20 which is at the position E but, on account of its motorization, cannot pick up the customer 12 at the position A. Rather, the customer 12 would initially have to get (for example, walk) to the meeting point F. However, the mobile service vehicle 20 at the position E is available and can provide the desired hairdressing service. Since the distance from the position A of the customer 12 to the meeting point F is not far, the customer 12 would in all likelihood tend to order the CAB at the position E. However, the operator of the CAB at the position D would like to make the customer 12 aware of its offer and would also like to avoid the climate zone applicable at the position A being infringed by exhaust gases from the mobile service vehicle 20 at the position E. The operator has therefore uploaded a data record to the server 7, in which the mobile service vehicle 20 at the position D is identified as a particularly suitable alternative to the preference which is not available (mobile service vehicle 20 at the position C). As a boundary condition of a possible booking and as an incentive for the customer 12, the operator offers a free journey to the position A and additionally a 20% reduction on the barber service offered by the operator. Accordingly, an entry representing the operator's mobile service vehicle 20 in the list of search results 17 is highlighted in color and is provided with an indication of the reduction and the free journey. The entry appears at that position at which the entry for the CAB preferred by the customer 12 at the position C would usually appear (if available). In this manner, the customer 12 can be made aware of the alternative suggestion in the best possible manner without having to change to a further screen view or at least searching for an alternative in the presented arrangement. Since the alternative suggestion is selected more quickly and easily in this manner, less energy is converted inside the smartphone 16 and the user interface is subjected to less wear and tear.

Figure 5:
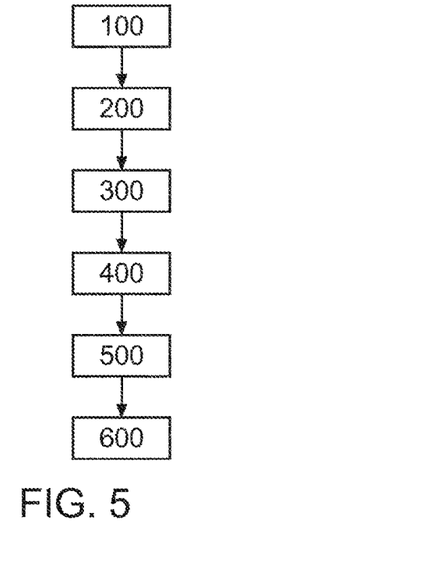
FIG. 5 shows a flowchart illustrating an exemplary embodiment of a disclosed method.

FIG. 5 shows operations of an exemplary embodiment of a disclosed method for assisting a customer when requesting a mobile service vehicle which can be used according to the disclosed embodiments. In operation at 100, a need of the customer to obtain a service during a journey of the mobile service vehicle is determined. This can be effected, for example, by a user interface of a smartphone and/or in a sensor-based manner (automatically). In operation at 200, it is determined that an option preferred by the customer for satisfying the need is not available. Alternatives for the journey desired by the customer are then searched for. In this case, it is determined in operation at 300 that a data record especially qualifies a CAB as an alternative suggestion. In other words, the provider has indicated his CAB or his service as available in a particularly flexible manner and for a short time by the data record and is also prepared to accept detours for free. For example, the data record may have been stipulated on the basis of the fact that the CAB needs to travel in the direction of the customer anyway to pick up operating resources and/or energy or to carry out maintenance operations. In operation at 400, an alternative suggestion is therefore output to the customer with the output of a boundary condition predefined in the data record. For example, a reduction, short-term readiness, a similar and/or additional service may be indicated in the data record. A plurality of data records assigned to respective mobile service vehicles can therefore be compared with one another and, depending on the information content of the data record, a best possible suitability, a greatest possible reduction, a greatest possible benefit for the operator or the like, it is possible to decide which of the CABs are output as the best alternative to the customer. In operation at 500, a selection of the CAB by the customer is then determined. The CAB was indicated by the data record as the best possible alternative to the unavailable preference and has boundary conditions which are favorable for the customer. On the one hand, the alternative suggestion results in a satisfied customer who not only discovers a new service but also has a positive service experience by virtue of the boundary conditions mentioned in the data record. On the other hand, the boundary conditions defined in the data record are used in operation at 600 to process a remuneration of an operator of the vehicle carriers and/or of the application used to provide the service by the service provider. For example, an obligation to provide the service on the part of the service provider with respect to the operator of the app may arise only in response to the selection of the alternative suggestion by the customer, the level/nature of which results from the progression of the service during the journey. For example, a percentage amount of the remuneration for the service may need to be paid to the operator of the app. Alternatively or additionally, a review by the customer after the service has been provided may influence the remuneration of the operator. For example, if the customer was dissatisfied with the alternative suggestion, an increased amount may need to be paid by the service provider to the operator who forwards it proportionately to the customer as an apology or as a future incentive to use the vehicle carriers provided thereby. In this manner, the customer can still trust the quality management of the operator despite a negatively perceived alternative suggestion.

LIST OF REFERENCE SIGNS

1 First CAB
1*a* Mechanical interface of the CAB
1*b* IT/energy interface of the CAB
2 Second CAB
7 Server
8 Radio tower
10 Vehicle carrier
10*a* Mechanical interface of the vehicle carrier
10*b* Energy/IT interface of the vehicle carrier
12 User
13 Service provider
14 Microservice provider
16 Smartphone
17 List of search results
20 Mobile service vehicle
100-600 Method operations
D1-D8 Services
A Position of the user
B Target position of the user
C, D, E Positions of the CAB
F Meeting point
P Arrow

The invention claimed is:

1. A method for requesting a mobile service vehicle comprising a vehicle carrier and a cabin (CAB) which is temporarily connected to the vehicle carrier and is equipped to perform a service, the method comprising:
   determining a need of the customer to obtain a desired service within the vehicle carrier during a journey;
   determining the status of mobile service vehicles via a server,
   comparing a corresponding CAB and service equipment of each of the available mobile service vehicles with the need of the customer,
   determining that a preference of the customer for satisfying the need cannot be met; and
   in response to determining that the customer preference cannot be met,
   automatically outputting alternative suggestions with respect to the customer preference and based on the available mobile service vehicles so that the customer can select the alternative suggestion without switching to another screen view, the alternative suggestions automatically outputted in the screen view based on a personal movement and consumption history of the customer stored on a data memory of a server or on a mobile device, and
   in response to input from the customer, booking one of the available mobile service vehicles with a corresponding CAB equipped with service equipment corresponding to a particular mobile service of the CAB to pick up the customer at a starting point of the journey,
   wherein the available mobile service vehicles have CABs equipped with service equipment including one of a sink, workbenches, videoconferencing hardware, a UV radiation unit, or restaurant equipment.

2. The method of claim 1, wherein the need of the customer is determined by:
   selecting a CAB type.

3. The method of claim 1, further comprising highlighting an entry assigned to the alternative suggestion in a presentation of search results in comparison with other entries in the presentation of search results.

4. The method of claim 1, wherein the determination that the preference cannot be met is based on a ready status and/or an occupancy status of the CAB.

5. The method of claim 1, wherein the alternative suggestion with respect to the preference is automatically output by a wireless communication device belonging to the customer.

6. The method of claim 1, wherein the alternative suggestion defines:
   an alternative CAB; and/or
   an alternative category of the service; and/or
   an alternative journey time; and/or
   an alternative pickup location; and/or
   an alternative destination.

7. The method of claim 1, further comprising:
   determining a data record which especially qualifies the CAB of one of the available service vehicles as an alternative suggestion, and
   presenting an alternative suggestion with the output of a boundary condition predefined in the data record.

8. The method of claim 7, further comprising:
   determining a selection of the CAB, to which the boundary condition is assigned, by the customer, and
   using the boundary condition defined in the data record to book the CAB.

9. The method of claim 1, wherein the alternative suggestion is determined based on a predefined relationship between the preference and the CAB assigned to the alternative suggestion.

10. The method of claim 1, further comprising inputting the need of the customer into a mobile terminal, wherein outputting the alternative suggestion includes displaying it on the mobile terminal.

11. An apparatus for requesting a mobile service vehicle comprising a vehicle carrier and a cabin (CAB), which is temporarily connected to the vehicle carrier and is equipped to perform the service, the apparatus comprising:
   a data input;

an evaluation unit;

and a data output, wherein the evaluation unit is configured to:

determine a need of the customer to obtain a desired service within the vehicle carrier during a journey by means of the data input, determine the status of mobile service vehicles, compare available mobile service vehicles and the corresponding CAB and service equipment of each of the available mobile service vehicles with the need, determine that a preference of the customer for satisfying the need cannot be met and, in response thereto, and automatically output an alternative suggestions with respect to the preference and based on data records uploaded by the available mobile service vehicles by the data output so that the customer can select the alternative suggestion without switching to another screen view, the alternative suggestion automatically outputted in the screen view based on a personal movement and on a consumption history of the customer stored on a data memory of a server or on a mobile device, and in response to a further input, booking one of the available mobile service vehicles with a corresponding CAB equipped with service equipment corresponding to a particular mobile service of the CAB to pick up the customer at a starting point of the journey, wherein the available mobile service vehicles have CABs equipped with service equipment including one of a sink, workbenches, videoconferencing hardware, a UV radiation unit, or restaurant equipment.

12. A non-transitory computer program product comprising computer readable instructions which, when executed on a computer processor, cause the processor to provide functionality of the evaluation unit of the apparatus of claim 11.

* * * * *